(No Model.) 2 Sheets—Sheet 1.

J. AUSTIN.
STEAM SCRAPER.

No. 576,422. Patented Feb. 2, 1897.

WITNESSES:

INVENTOR
J. Austin
BY
ATTORNEYS.

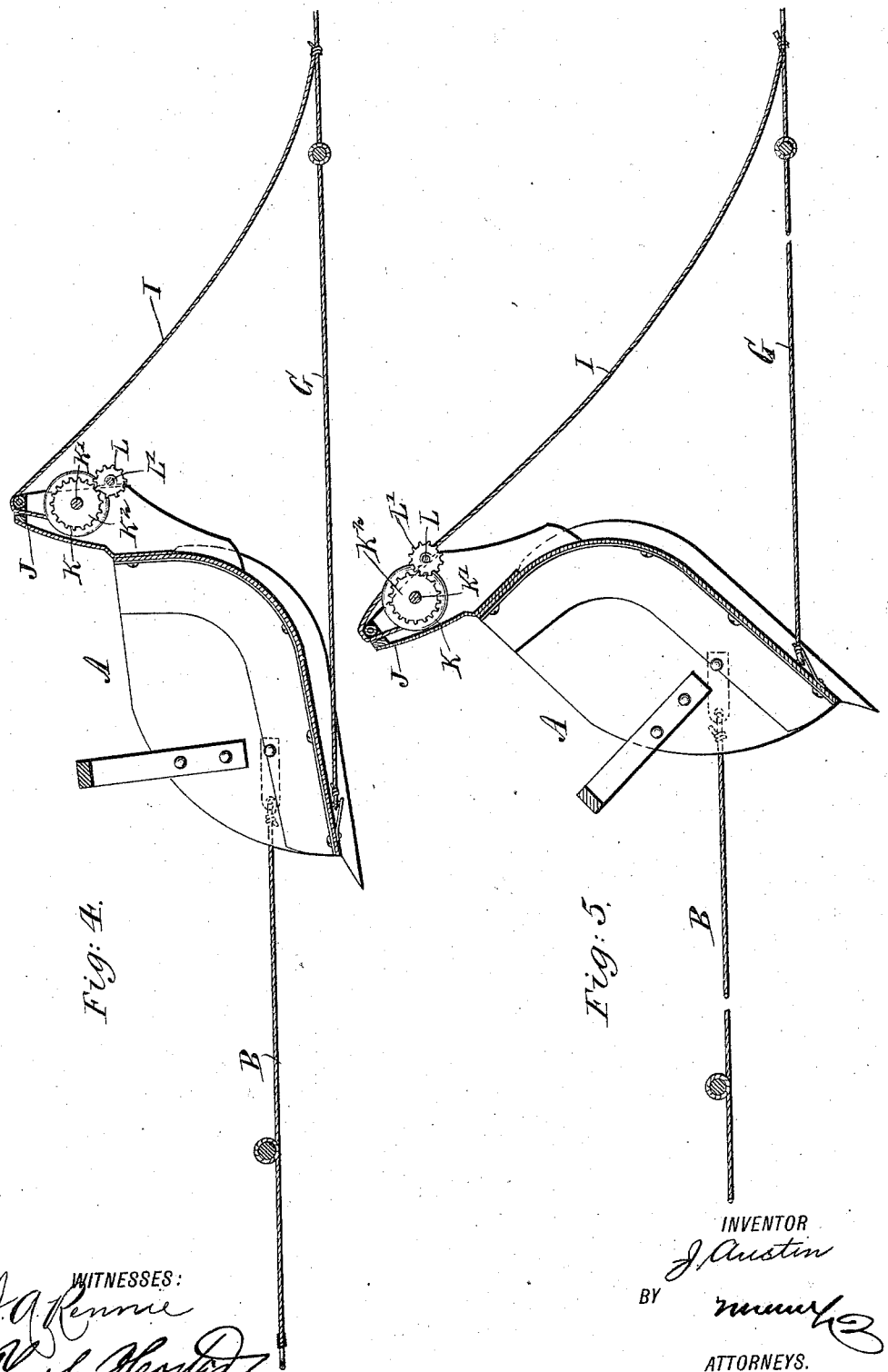

UNITED STATES PATENT OFFICE.

JOHN AUSTIN, OF SAN FRANCISCO, CALIFORNIA.

STEAM-SCRAPER.

SPECIFICATION forming part of Letters Patent No. 576,422, dated February 2, 1897.

Application filed May 23, 1896. Serial No. 592,741. (No model.)

*To all whom it may concern:*

Be it known that I, JOHN AUSTIN, of San Francisco, in the county of San Francisco and State of California, have invented a new and Improved Steam-Scraper, of which the following is a full, clear, and exact description.

The invention relates to excavating machinery; and its object is to provide a new and improved steam-scraper which is simple and durable in construction and arranged to readily scrape up the ground and to dump the same whenever desired.

The invention consists of certain parts and details and combinations of the same, as will be fully described hereinafter, and then pointed out in the claims.

Reference is to be had to the accompanying drawings, forming a part of this specification, in which similar characters of reference indicate corresponding parts in all the views.

Figure 1:
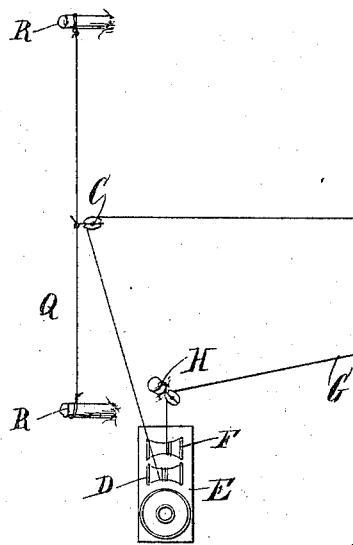
Figure 2:
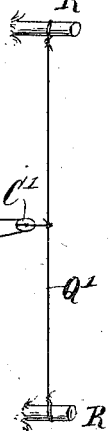
Figure 2:
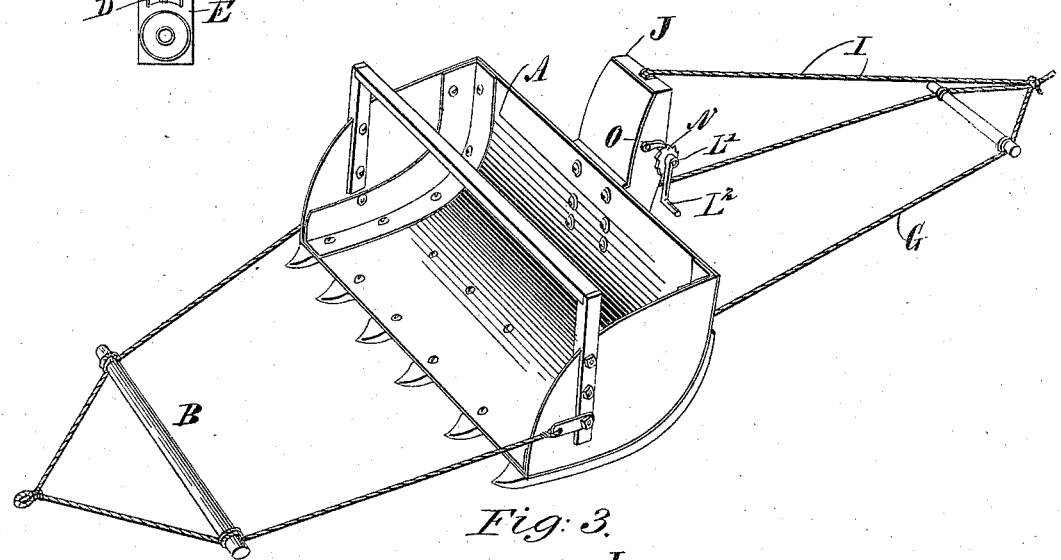
Figure 3:
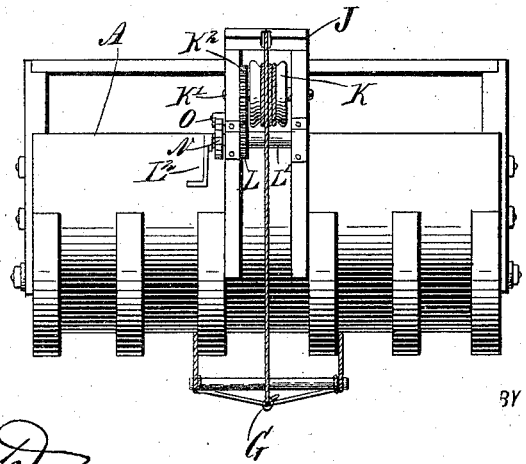

Figure 1 is a plan view of the improvement as applied. Fig. 2 is an enlarged perspective view of the scoop and lines connected therewith. Fig. 3 is a rear end elevation of the same. Fig. 4 is a sectional side elevation of the same with the scoop in a scraping position, and Fig. 5 is a like view of the same with the scoop in a dumping position.

The improved scraper is provided with a suitably-constructed scoop A, connected with the forwardly-extending pulling or head line B, passing over the sheave C. It then extends to and winds upon a drum D, forming part of a hoisting-machine E, also provided with a second drum F, on which winds one end of the holdback-line G for the scoop A.

The holdback-line G extends from the drum F over the sheave H, to then pass over a sheave C', arranged directly opposite the sheave C, as plainly indicated in Fig. 1. From the sheave C' the holdback-line G extends directly to the rear end of the scoop A, and this portion of the holdback-line G is in alinement with that part of the head-line B extending from the scoop A to the sheave C.

A dumping line or cable I connects with the holdback-line G a suitable distance in the rear of the scoop A, and this dumping-line then extends upwardly and forwardly and finally passes through an opening in the frame J to a drum K, secured on a shaft K', extending transversely and journaled in the said frame J. The latter is secured to the back of the scoop A, as plainly indicated in the drawings.

The shaft K' is provided with a gear-wheel $K^2$ in mesh with a pinion L, secured on a transversely-extending shaft L', mounted to turn in suitable bearings in the frame J, and provided at one outer end with a crank-arm $L^2$, adapted to be taken hold of by the operator for conveniently turning the said shaft L' to rotate the drum K, so as to wind up the line or cable I, as hereinafter more fully described. On the shaft L' is secured a ratchet-wheel N, engaged by a pawl O, fulcrumed on one side of the frame J.

The operation is as follows: When the scoop A is near the point of filling, in the neighborhood of the sheave C', then the line I is kept slack and the brake on the drum F is applied slightly, so as to cause the quicker winding up of the head-line B than the holdback-line G to insure a slight tilting of the scoop A, as indicated in Fig. 4, to cause the said scoop to fill itself. The scoop is not liable to upset while passing from the point of filling to the point of dumping, near the sheave C, as there is more leverage on the holdback-line G and dumping-line I than there is on the head-line B. If the scoop is inclined to upset while filling, the dumping-line I will prevent it. Now during the movement of the scraper A from the point of filling to the point of dumping the holdback-line G is kept sufficiently taut to steer the scoop properly, and when the place of dumping is reached the operator throws the pawl O out of engagement with the ratchet-wheel N, so that the dumping-line I can unwind from the drum K, and the scoop A by a strong pull on the head-line is caused to move into a dumping position, as indicated in Fig. 5. The operator firmly holds onto the holdback-line G during this operation, while the head-line B is wound upon its drum D to insure a proper upsetting of the scoop to dump the contents thereof. It is understood that the drum F is provided with a suitable ratchet mechanism to hold the line G back to insure the dumping operation in the manner above described. When the dumping has been completed, the head-line B is slacked and the scoop will drop back. The operator steps to the scoop A and turns the crank L² to again wind up the dumping-line I, leaving it slack enough so that the scoop will tilt when falling, and at the same time throws the pawl O again in engagement with the ratchet-wheel N. The two sheaves C and C' are preferably adjustable transversely on ropes Q Q', stretched on side posts R and R', respectively, as illustrated in Fig. 1.

Having thus described my invention, I claim as new and desire to secure by Letters Patent—

1. A steam-scraper, comprising a scoop, a pulling or head line for the scoop, a holdback-line, a dumping line or cable connected with the holdback-line in the rear of the scoop and also connected with the said scoop, and means for tightening and slacking the said dumping-line, whereby the scoop may be held in position for filling or be released so that it can be swung to a dumping position, substantially as shown and described.

2. A steam-scraper, comprising a scoop-carrying drum, a pulling or head line for the scoop, a holdback-line for the scoop, and a dumping line or cable adapted to wind upon the drum carried by the scoop and connected with the holdback-line, substantially as shown and described.

3. A steam-scraper provided with a scoop, a drum journaled on the said scoop, a pulling or head line connected with the scoop, a holdback-line also connected with the scoop, a dumping line or cable connected with the holdback-line in the rear of the said scoop and adapted to wind upon the said drum, and means for rotating the said drum and locking the same in place, substantially as shown and described.

4. A steam-scraper, comprising a suitable drum-hoisting engine, a scoop, a head-line extending from the front end of the scoop to one of the drums of said engine, a holdback-line connecting the rear end of the scoop with the other drum on the said engine, and a dumping-line connected with the said holdback-line and with the drum on the said scoop, substantially as shown and described.

5. A steam-scraper, comprising a suitable drum-hoisting engine, a scoop, a head-line extending from the front end of the scoop to one of the drums of said engine, a holdback-line connecting the rear end of the scoop with the other drum on the said engine, a dumping-line rigidly connected with the said holdback-line and with the drum on the said scoop, and means, substantially as described, for locking the said drum in place, as set forth.

JOHN AUSTIN.

Witnesses:
JOHN W. STAHLER,
S. WILSON GUY.